United States Patent [19]
Greer

[11] 3,714,555
[45] Jan. 30, 1973

[54] CONDUCTIVITY SENSOR

[75] Inventor: Homer L. Greer, Bryn Athyn, Pa.

[73] Assignee: Honeywell Inc., Minneapolis, Minn.

[22] Filed: May 25, 1971

[21] Appl. No.: 146,745

[52] U.S. Cl. ............................................. 324/30 B
[51] Int. Cl. ............................................. G01n 27/42
[58] Field of Search.................324/30 B, 30 R, 62, 65

[56] References Cited

UNITED STATES PATENTS

| | | | |
|---|---|---|---|
| 2,922,103 | 1/1960 | Smith | 324/30 B |
| 3,025,458 | 3/1962 | Eckfeldt | 324/30 B |
| 3,283,240 | 11/1966 | Spady | 324/30 B |

FOREIGN PATENTS OR APPLICATIONS

| | | | |
|---|---|---|---|
| 243,946 | 9/1969 | U.S.S.R. | 324/30 B |

*Primary Examiner*—Michael J. Lynch
*Attorney*—Arthur H. Swanson and Mitchell J. Halista

[57] ABSTRACT

A conductivity cell has a pair of similar conductivity measuring sub-assemblies extending in opposite directions from an annular energizing electrode. Each sub-assembly includes a pair of spaced-apart sensing electrodes mounted within a hollow cylindrical electrically-insulating member having electrical connecting wires embedded in the walls thereof. The two pairs of annular sensing electrodes are connected in parallel to a conductivity measuring apparatus while an energizing signal is applied between the annular energizing electrodes and a wall of a flow line encompassing the conductivity cell.

3 Claims, 1 Drawing Figure

PATENTED JAN 30 1973
3,714,555
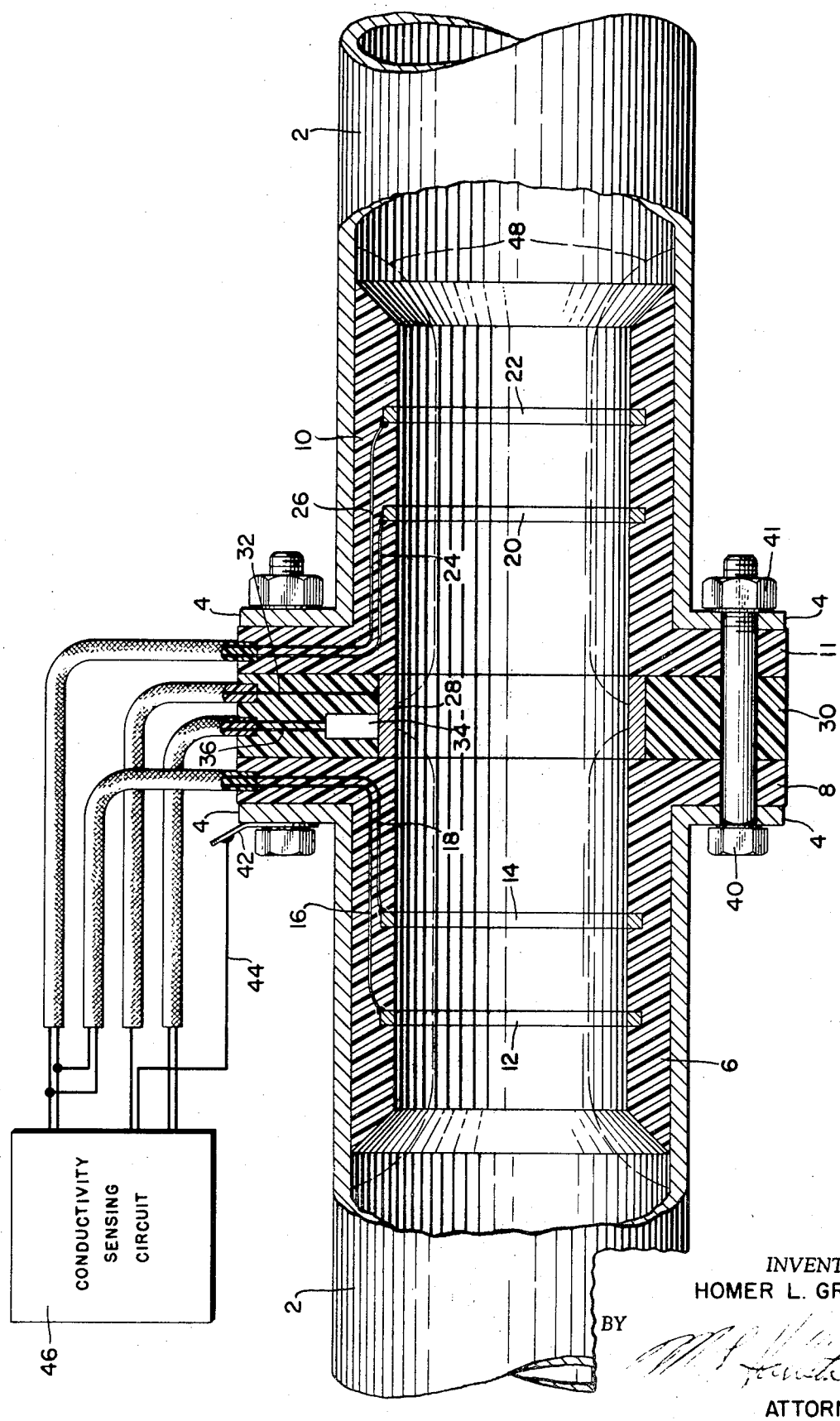
INVENTOR.
HOMER L. GREER
BY
ATTORNEY.

CONDUCTIVITY SENSOR

BACKGROUND OF THE INVENTION

Conductivity cells for measuring the electrical conductivity of substances are well known, e.g., U.S. Pat. No. 3,283,240 to Richard J. Spady. Such conductivity cells include a cell portion arranged to contact the substance under analysis and an energizing measuring circuit portion connected thereto. Specifically, the electrical conductivity of the substance being analyzed is measured in terms of the voltage drop produced across a portion of the substance, between two output electrodes of a cell, by passing an electrical current from said circuit portion through the substance between two energizing electrodes of a cell in an electrical path which includes the substance between the two output electrodes. The conductivity of the substance is measured by determining the value of a current which must be passed through the substance in order to maintain a predetermined value of voltage drop across the portion of the substance between the two output electrodes. In order to adapt such conductivity cells to industrial process control applications, it is essential that the structure of the cell portion be arranged for inclusion in a flow line of a process whereby a continuous conductivity measurement can be effected. However, that type of conductivity cell also fails to provide means for minimizing transient errors during the conductivity measurement occassioned by the movement of the substance under analysis past the sensing electrodes. Another type of prior art conductivity cell having a structure for inserting the cell into a flow line is shown in U.S. Pat. No. 3,025,458 of E.L. Eckfeldt et al. However, such a prior art cell is not adaptable to a conventional process flow line inasmuch as it requires a sharp bend to be introduced in the flow line, and it offers significant resistance to the flow as a result of its internal complexity as well as responding to the aforesaid transient errors in conductivity measurement.

Accordingly, a object of the present invention is to provide an improved conductivity cell for minimizing transient errors in conductivity measurements.

Another object of the present invention is to provide a improved conductivity cell for inclusion in a flow line without introducing a significant change in the flow pattern.

A further object of the present invention is to provide an improved conductivity cell for inclusion in a flow line and having minimum resistance to the flow therethrough of a substance under analysis.

SUMMARY OF THE INVENTION

In accomplishing these and other objects, there has been provided, in accordance with the present invention, a conductivity cell having a first cylindrical member having an outwardly extending flange at one end thereof and a second similarly shaped cylindrical member. The flanges of the cylindrical members are arranged to be clamped between the flanges of a flow-line for a substance to be analyzed. A first pair of annular output electrodes are positioned within the first cylindrical member and a second pair of output electrodes are positioned within the second cylindrical member. Electrical connections from conductivity sensing circuits are made to the first and second pair of output electrodes by wires embedded within the electrically insulating cylindrical members. A first energizing electrode is positioned between the flanges of the cylindrical members in electrical contact with the substance being analyzed. An electrical connection is provided between the first electrodes and one side of an energizing circuit. The other side of the energizing circuit is connected to the flow line wall to complete the electrical current path from the first energizing electrode.

BRIEF DESCRIPTION OF THE DRAWING

A better understanding of the present invention may be had when the following detailed description is read in connection with the accompanying drawing in which the single FIGURE is a pictorial illustration of a cross section of a conductivity cell embodying the present invention.

DETAIL DESCRIPTION

Referring to the single FIGURE drawings, there is shown a conductivity cell arranged to be inserted into a metal flow line 2, e.g., a stainless steel pipe, between the flanges 4 of a joint in the flow line 2. A first flanged cylindrical member 6 having an outwardly extending flange 8 at one end thereof is positioned within the flow line with the flange 8 extending between the flanges 4 of the flow line 2. A second similarly shaped cylindrical member 10 having a flange 11 at one end thereof is positioned within the flow line 2 with its flange 11 between the flow line flanges 4 and having its cylindrical body extending in a direction opposite to that of the first cylindrical member 6. A first pair of annular, or washer shaped, sensing electrodes 12, 14 are positioned within the first cylindrical member 6. The sensing electrodes 12 and 14 maybe of platinum or any other suitable electrode material selected for inertness with respect to the solution being analyzed. The outer diameters of the sensing electrodes 12 and 14 are embedded within the inner wall of the first cylindrical member 6. The inner diameters of the annular electrodes 12 and 14 are arranged to provide a substantially flush surface with the inner surface of the first cylindrical member 6 to minimize interference with a flow of a substance under analysis through the cylindrical member 6. Electrical connections are provided to the first and second sensing electrodes 12 and 14 by a pair of wires 16 and 18, respectively, imbedded within the wall of the first cylindrical member 6 between the electrodes 12 and 14 and a free end of each of the wires 16 and 18 located at the outer periphery of the flange 8.

The second cylindrical member 10 is arranged to have substantially the same structure as the above-described first cylindrical member 6. Thus, a second pair of annular sensing electrodes 20 and 22 are mounted within the second cylindrical member 10 with their outer diameters embedded within the inner wall of the second cylindrical member 10. Electrical connections are provided to the third and fourth sensing electrodes 20 and 22 by a pair of wires 24 and 26, respectively, embedded within the wall of the second cylindrical member 10 between the electrodes 20 and 22 and a free end of each of the wires 24 and 26. Specifically, the wires 24 and 26 are arranged to exit from the cylindrical member 10 at the outer periphery of the flange 11. The first and the second cylindrical members 6 and 10 may be made of any suitable dimensionally stable and chemically inert electrically insulating material such as the synthetic resin trifluorochloroethlyene.

An energizing electrode 28 in the form of an annular ring is mounted between the flanges 8 and 11 of the first and second cylindrical members 6 and 10. The inner diameter of the energizing electrode 28 is arranged to be substantially equal to the inner diameters of the first and second cylindrical members 6 and 10 to provide a continuous, projection-free surface therewith. The energizing electrode 28 is supported on an annular insulating element 30 which may be made of the same material as the first and second cylindrical members 6 and 10. The energizing electrode 28 may be attached to the annular insulating member 30 in the same manner as the electrodes 12, 14, 20, and 22 are mounted within the corresponding ones of the cylindrical members 6 and 10. An electrical connection to the energizing electrode 28 is provided by a wire 32 embedded within the insulating annular member 30 between the electrode 28 and a free end of the wire 32. A temperature compensating element 32, e.g., a thermister, is, also, embedded within the annular member 30 and is operatively attached to the energizing electrode 28 to effect a heat transfer relationship therewith. Electrical connections to the thermister element 34 are provided by a pair of wires 36 embedded within the annular element 30 between the element 34 and a free end of each of the wires 36. The flanges 4 of the flow line 2 are compressed against the flanges 8 and 11 of the first and second cylindrical members 6 and 10 with the annular insulating member 30 being compressed therebetween to form a fluid-tight seal by any suitable means such as conventional bolts 40 passing through the aforesaid elements and secured thereto by a nut 42 on the threaded end of each of the bolts 40.

An electrical connection to the metal flow line 2 whereby the flow line 2 is used as a second energizing electrode to complete a current path from the first energizing electrode 28 may be provided by a solder lug 42 mounted under the head of one of the bolts 40 used to clamp the pipe flanges 4. If the flow line 2 is made of a non-metallic material, a second energizing electrode can be provided by mounting a third annular electrode (not shown) in a manner similar to the sensing electrodes 12, 14, 20 and 22 at the unflanged end of each of the cylindrical member 6 and 10. A connecting wire to a corresponding one the the aforesaid annular second energizing electrodes would be embedded within the wall and flange of the respective one of the cylindrical members 6 and 10 in a manner similar to the wires 16, 18, 24, and 26 with an electrical connection to the sensing circuit 46 provided thereby. An electrically conductive lead 44 is connected between the solder lug 42 and a conductivity sensing circuit 46. In order to assure a connection to both halves of the flow line 2, an electrically conductive external strap (not shown) may be provided across the flanges 4 and the insulating members clamped therebetween. The conductivity sensing circuit 46 is also connected to the aforesaid electrodes 12, 14, 20, 22, and 28 as well as the thermister element 34 by means of the free ends of the respective wires attached thereto.

In operation, the apparatus of the present invention is arranged to operate in combination with the conductivity sensing circuit 46 in a manner similar to that set forth in the aforesaid U.S. Pat. No. 3,283,240. Briefly, this operation involves passing an alternating energizing current through a substance being energized between two energizing electrodes of the conductivity cell, e.g., electrodes 2 and 28. This current flow produces between two output sensing electrodes of the cell, e.g., sensing electrodes 12, 14 and sensing electrodes 20, 22, an alternating current conductivity signal of a value dependent jointly upon the conductivity of the substance being analyzed and the level of the current flow. The current flow is automatically adjusted by the conductivity sensing circuit , e.g., sensing circuit 46, to maintain the conductivity signal equal to an opposing bias signal for a predetermined fixed value. The adjusted value of the current is then proportional to the conductivity of the substance being analyzed over a linear scale whereby a measure of this current provides a linear measure of the substance conductivity.

The first pair of output sensing electrodes 12 and 14 is connected in parallel with the second pair of output sensing electrodes 20 and 22, e.g., electrode 12 is connected to electrode 20 and electrode 14 is connected to electrode 22. The current flow in the substance being analyzed between the energizing electrode 28 and the wall of the flow line 2 is pictorially indicated by the dashed lines 48. The spacing between an adjacent pair of output sensing electrodes 12 and 14, 20 and 22 is arranged so that the current flow path 48 is substantially parallel through the inner diameter of the sensing electrodes 12, 14, 20 and 22.

The unflanged ends of the cylindrical members 6 and 10 may be chamfered to provide a smooth transition for the flow of the substance being analyzed from the inside diameter of the flow line 2 to the inside diameter of the cylindrical members 6 and 10. The use of two substantially identical electrode assemblies facing in opposite directions from the flanged area of the pipe line 2 establishes a similar impedance path in both directions from the center electrode 28 to insure an equal electrical current flow from the center energizing electrode 28 in both directions to the wall of the flow line 2 and, therefore, similar voltage gradients past the first pair of sensing electrodes 12 and 14 with respect to the second pair of electrodes 20 and 22. Further, the connection of the two pairs of sensing electrodes in parallel produces a lower source impedance for the output signal whereby the conductivity of the substance being analyzed is measured on a linear basis even for low conductivity values.

Thus, the apparatus of the invention is effective to produce a conductivity representative output signal which is more accurate than the single conductivity cell structure taught by the aforesaid prior art patents. Finally, economy of manufacturing the conductivity cell is effected by using two substantially identical sub-assemblies rather than two different sub-assemblies which would require separate manufacturing steps.

Accordingly, it may be seen that there has been provided, in accordance with the present invention, an improved conductivity cell for minimizing transient conductivity measurement errors and adapted for inclusion in a flow line without introducing a significant change in the flow pattern and having a minimum resistance to the flow therethrough of a substance under analysis.

The embodiments of the invention in which an exclusive property or privilege is claimed are defined as follows:

1. A conductivity cell comprising a first hollow cylindrical body of dimensionally stable, electrically insulating material, a first pair of annular electrodes enclosed within said first body, spaced from each other axially of said body and coaxial therewith, a first pair of electrical conductors embedded within said first cylindrical body and extending between respective ones of said first pair of electrodes and a free end of each of said pair of electrical conducters external to said first body, a second cylindrical body similar to said first cylindrical body, a second pair of annular electrodes enclosed within a said second cylindrical body, spaced from each other axially of said body and coaxial therewith, a second pair of electrical conductors embedded within said second cylindrical body and extending between respective ones of said second pair of electrodes and a free end of each of said second pair of conducters external to said second cylindrical body, said first and second cylindrical body being coaxial and separated by a predetermined space, an annular energizing electrode located in said space between said first and second cylindrical bodies and an electrical conducter connected between said electrode and a free end of said conducter external to said first and second cylindrical bodies, said first and second cylindrical bodies each including an outwardly extending flange at one end thereof and said first and second pairs of electrical conducters exiting from respective ones of said cylindrical bodies at an outer periphery of said flange, said flanges of said first and second bodies being arranged in an adjacent relationship to clamp said energizing electrode there-between with the free ends of said first and second cylindrical bodies extending in opposite directions.

2. A conductivity cell as set forth in claim 1 wherein the spacing between each pair of sensing electrodes is substantially less than the length of a corresponding one of said first and second cylindrical members.

3. A conductivity cell as set forth in claim 1 wherein said annular energizing electrode has an inner diameter substantially equal to the inner diameter of said first and second cylindrical bodies and is coaxial therewith.

* * * * *